United States Patent
Stewart et al.

[19]

[11] Patent Number: 5,964,566
[45] Date of Patent: Oct. 12, 1999

[54] PORTABLE DRIVE-OVER HOPPER

[75] Inventors: Ronald S. Stewart, Rock Rapids; Lyndon J. Hass, George, both of Iowa

[73] Assignee: Sudenga Industries, Inc., George, Iowa

[21] Appl. No.: 08/932,124

[22] Filed: Sep. 17, 1997

[51] Int. Cl.⁶ .................................................. B65G 67/02
[52] U.S. Cl. .......................... 414/572; 198/302; 198/311; 198/550.2; 198/550.12; 198/735.3; 414/398
[58] Field of Search .................................. 414/340, 376, 414/390, 397, 398, 345, 572–574, 353, 528; 198/302, 311, 550.2, 550.12, 735.3

[56] References Cited

U.S. PATENT DOCUMENTS

| | | | |
|---|---|---|---|
| 396,197 | 1/1889 | Dodge | 414/376 X |
| 809,373 | 1/1906 | Hof et al. | 198/311 |
| 947,592 | 1/1910 | Gilman | 198/550.2 X |
| 988,684 | 4/1911 | Ackerman | 414/574 |
| 1,272,425 | 7/1918 | Guthrie | 414/574 |
| 1,752,612 | 4/1930 | Owens et al. | 198/735.3 |
| 1,770,650 | 7/1930 | Levin | 198/735.3 |
| 2,251,990 | 8/1941 | De Young | 414/572 |
| 2,682,947 | 7/1954 | Belt | 198/550.12 |
| 3,378,152 | 4/1968 | Warner | 414/574 |
| 3,528,570 | 9/1970 | Pase | 414/376 |
| 3,606,050 | 9/1971 | Silver | 414/574 |
| 3,802,584 | 4/1974 | Sackett, Sr. et al. | 414/376 |
| 4,171,040 | 10/1979 | Nickol | 198/302 |
| 4,494,903 | 1/1985 | Badicel et al. | 414/376 |
| 4,813,839 | 3/1989 | Compton | 414/345 |
| 5,088,871 | 2/1992 | Mellish | 414/327 |
| 5,174,433 | 12/1992 | Moser | 198/735.3 X |
| 5,297,914 | 3/1994 | Ash | 414/574 |
| 5,297,920 | 3/1994 | Pomerville et al. | 414/376 |
| 5,387,073 | 2/1995 | Etherington et al. | 414/353 |

OTHER PUBLICATIONS

Brochure entitled "Drive Over Grain Pit," Wheatley Manufacturing, Inc., Massena, Iowa 50853, 1 page, undated (published prior to Sep. 17, 1997).

Brochure entitled "Portable Drive Over Hopper," Lloyd and Meredith, 202 Chestnut St., Atlantic, Iowa 50022, 1 page, undated (published prior to Sep. 17, 1997).

*Primary Examiner*—David A. Bucci
*Attorney, Agent, or Firm*—Kinney & Lange

[57] ABSTRACT

The invention relates to a portable drive-over grain hopper for use in moving grain. The hopper has an endless chain linkage with laterally extending paddle assemblies spaced therealong. A grain transfer bed extends from a low profile location in position to receive grain from a belly-dump or side-dump truck or trailer to a higher elevation discharge outlet. The grain transfer bed has a generally planar lateral width which is the same from the grain inlet to the discharge outlet, and is substantially spanned by each paddle assembly. Fold-down ramps are provided adjacent the inlet to allow a truck or trailer to drive over the grain hopper, which has a very low profile. The grain hopper has removable wheels and a removable hitch to allow it to be relocated as desired.

32 Claims, 7 Drawing Sheets

PORTABLE DRIVE-OVER HOPPER

BACKGROUND OF THE INVENTION

The present invention relates to a portable drive-over grain hopper for use in moving grain. In particular, the invention relates to an improved grain hopper that is capable of moving grain at a faster rate than similarly-situated devices known in the prior art.

Grain and other farm products are typically transported in vehicles known as "belly-dump" trucks or in similarly functioning trailers. Such trucks or trailers open from the bottom and empty their contents using the force of gravity. Grain is often transported by "side-dump" trucks or trailers also. In a side-dump truck or trailer, an opening on the side of the grain hopper basin allows the contents to be emptied out the side of the vehicle by the force of gravity. These trucks or trailers were originally designed to empty their contents into pits built into the ground. However, it often is not feasible for a pit to be built into the ground and thus an alternative method is needed to empty the contents of such trucks or trailers. In a drive-over grain hopper for this purpose, a very low profile is desired, since belly-dump and side-dump trucks and trailers are designed with low ground clearance. In addition, a drive-over hopper must be portable so that it can be towed to the desired grain transfer site and set up to function as a substitute for a dumping pit. Additionally, it is advantageous if a drive-over grain hopper is capable of moving large amounts of grain in order to facilitate rapid unloading of such trucks or trailers.

Due to the difficulty and impracticability of building dumping pits in some situations, portable devices have been proposed as a substitute to a below-ground dumping pit. The prior art reveals various conveyer-type devices for unloading and transferring grain and like material from a truck or trailer into an adjacent container or receptacle. Current grain transfer devices utilize a flighting or auger system to move the grain from under the truck or trailer to an elevated external location. Because of the requirement for a low profile under the truck or trailer, the size of the auger in these devices is limited, and thus the grain transfer rate is limited as well. Although the devices in the prior art embody specific useful features for the transport of grain and other farm products, there is a need for a low-profile drive-over hopper product capable of replacing dumping pits and which is also capable of moving grain at relatively high transfer rates.

SUMMARY OF THE INVENTION

The drive-over hopper of the present invention provides a unique hopper design which is relatively low in profile to the ground, but achieves a relatively high grain transfer rate. The portable drive-over grain hopper of the present invention includes a hopper body housing and a grain elevator housing connected to the hopper body housing. A hopper chamber is defined by the hopper body housing. The hopper chamber is aligned under a top wall of the hopper body and between longitudinally disposed sides and laterally disposed ends thereof. A grain elevator chamber is defined by the grain elevator housing, which has a lower end and a higher upper end. The lower end is coupled to one end of the hopper body and the upper end has a grain discharge outlet. The portable drive-over grain hopper has a pair of foldable, parallel ramps extending from each side of the hopper body housing, with the ramps spaced apart for reception of a truck or wagon thereon. There is at least one grain inlet opening in the top wall of the hopper body housing, with the grain inlet opening being aligned between the ramps. The portable drive-over grain hopper has a pair of ground transport wheels removably mountable to the upper body housing and hitch means for selectively coupling the hopper body housing to a prime mover for relocation thereof. A laterally planar grain transfer bed extends across the hopper and grain elevator chambers to divide them into respective upper and lower chambers, with the upper chamber being a grain transfer chamber and the lower chamber being a conveyor return chamber. The upper and lower chambers extend through both the hopper body and grain elevator housings, with the grain transfer chamber in communication with both the grain inlet opening in the top wall of the hopper body housing and the grain discharge outlet at the upper end of the grain elevator housing. The grain transfer bed has an operative width, and an endless conveyor linkage extends longitudinally over and under the grain transfer bed. A plurality of spaced-apart grain paddle assemblies are connected to the conveyor linkage, with each paddle assembly extending laterally substantially across the operative width of the grain transfer bed and having a lower paddle edge which slides over the grain transfer bed. Drive means are provided for moving the endless conveyor linkage and paddle assemblies connected thereto through the grain transfer chamber and conveyor return chambers.

While the above-identified drawings features set forth one preferred embodiment, other embodiments of the present invention are also contemplated, as noted in the discussion. This disclosure presents illustrative embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENT

Figure 1:
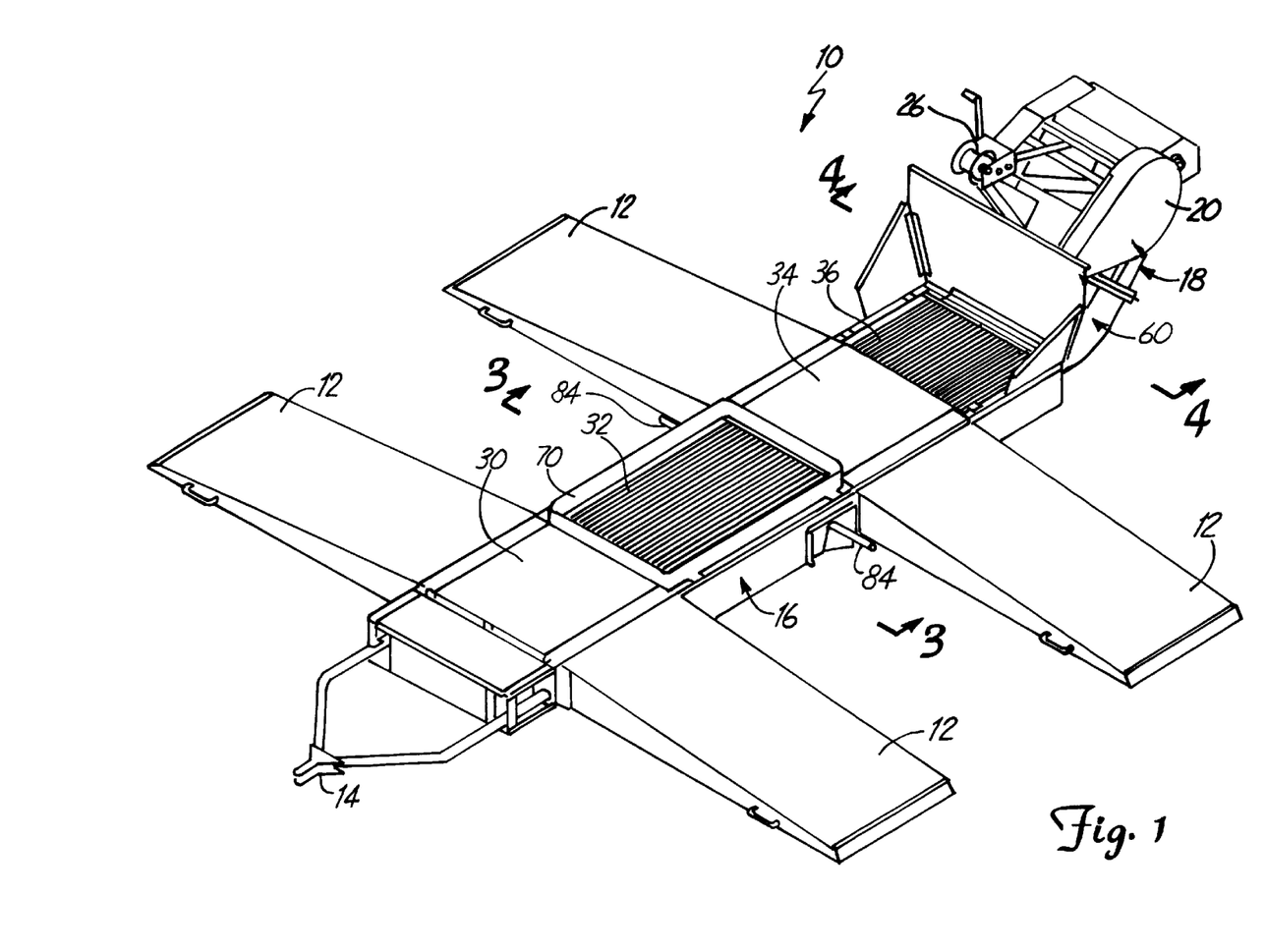
FIG. 1 is a perspective view of a portable drive-over grain hopper of the present invention.

FIG. 1 shows a preferred embodiment of a portable drive-over grain hopper 10 in accordance with the present invention. The portable drive-over grain hopper 10 is designed for year-round use in a farm-type environment, and in its preferred embodiment, the portable drive-over grain hopper 10 has its major structural components constructed from 10-gauge steel. The portable drive-over grain hopper 10 includes two pair of foldable, parallel ramps 12, a hitch 14, a hopper body housing 16, a grain elevator housing 18, and an elevator drive system 20.

During operation, the portable drive-over grain hopper 10 is set up as shown in FIG. 1. The driver of the belly-dump truck (or associated trailer or wagon) whose contents are to be emptied drives the truck onto the foldable, parallel ramps 12 such that the tires of the truck contact the foldable, parallel ramps 12. The driver stops the truck when its grain discharge outlet is aligned over a grain inlet of the hopper body housing 16. The elevator drive system 20 is activated and the driver begins to discharge the contents of the truck. The grain exits the truck from its grain discharge outlet and enters the hopper body housing 16 through the grain inlet, and then travels through the hopper body housing 16 and the grain elevator housing 18 until it exits the portable drive-over grain hopper 10 at a desired remote and elevated location.

As shown in FIG. 1, the foldable, parallel ramps 12 extend laterally from each side of the hopper body housing 16. The two pairs of foldable ramps 12 are configured such that they are parallel to one another and spaced apart in an amount appropriate to receive and support the wheels of the truck, trailer or wagon that is carrying a load of grain to be dumped.

The hitch 14 is of a type generally known in the art and is attached (fixedly or removably) to the hopper body housing 16. The hitch 14 facilitates connection of the portable drive-over grain hopper 10 to a prime mover (e.g., tractor, truck, etc.) for transportation of the device as will be described in greater detail below.

Figure 2:
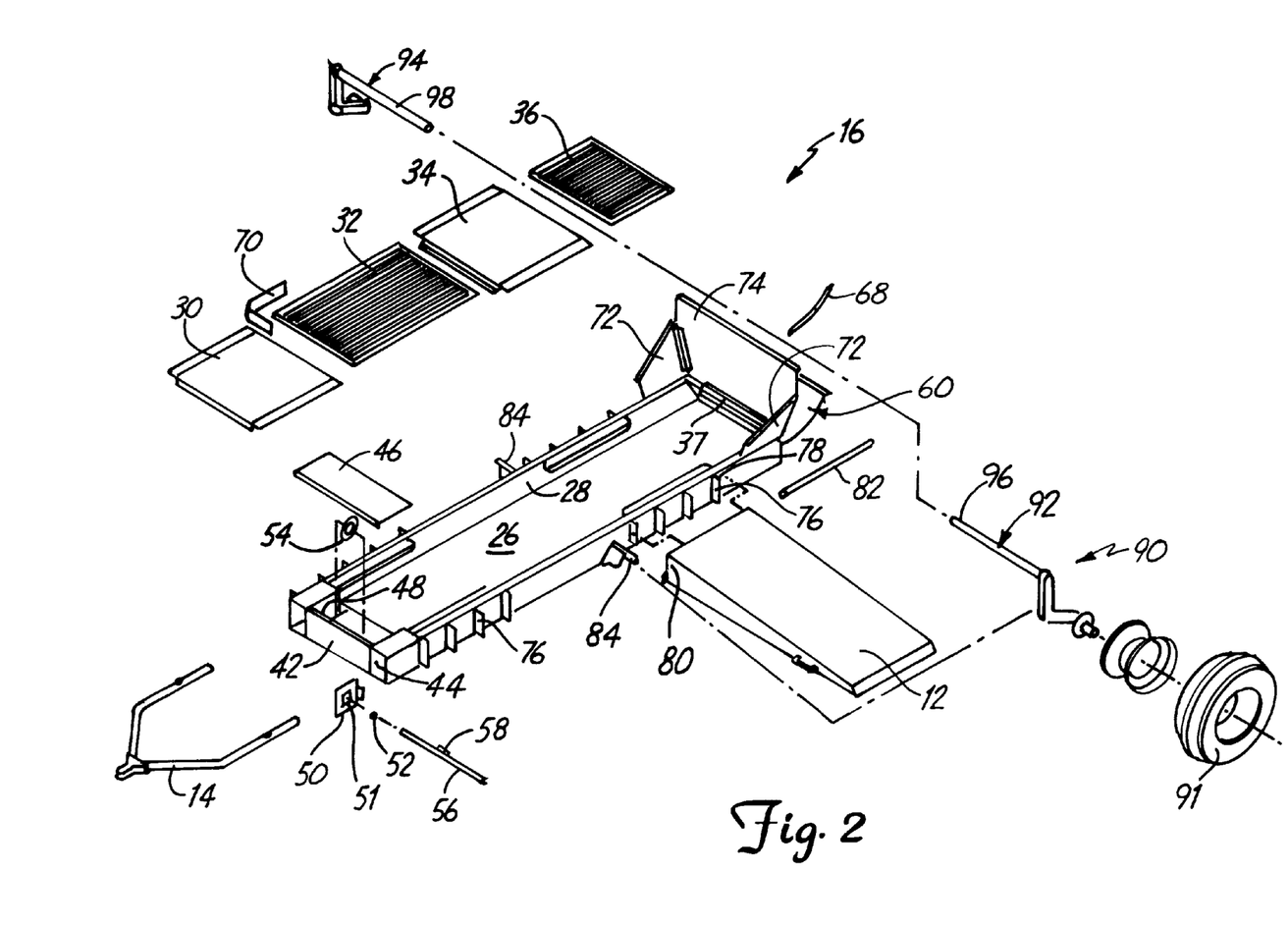
FIG. 2 is an exploded view of portions of the portable drive-over grain hopper of the present invention.
Figure 3:
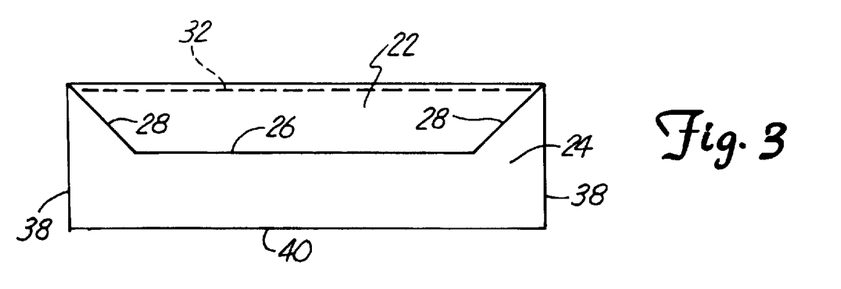
FIG. 3 is a schematic sectional view of the hopper body housing taken along line 3—3 in FIG. 1, with some parts not shown for clarity.

FIG. 2 show an exploded view of the components of the hopper body housing 16. The hopper body housing 16 is designed to be used underneath a belly-dump truck and thus has a low profile (preferably, less than ten inches deep, and more preferably, about 9.75 inches in depth). As best shown in FIG. 3, the hopper body housing 16 consists of an upper hopper chamber 22 and a lower hopper chamber 24 separated by a grain transfer bed 26. The upper hopper chamber 22 is formed by the grain transfer bed 26, a pair of opposed angled side panels 28, and a top side, which depending upon the longitudinal position along the hopper body housing, is defined by either a front bridge 30, a center grate 32, a discharge bridge 34, or a side grate 36. The lower hopper chamber 24 is formed by a pair of parallel housing sides 38, a housing base 40 for its bottom, and as its top, the undersides of the angled side panels 28, and the grain transfer bed 26.

The hopper body housing 16 will now be described in detail from left to right as it is shown in FIG. 2. As viewed in FIGS. 1 and 2, a left (near) end of the hopper body housing 16 is capped by a front end 42, cap sides 44, and a cap top 46. The front end 42, the cap sides 44, and the cap top 46 are all rectangular in cross-section and connected as shown in FIG. 2 to form a compartment with one open side. The grain transfer bed 26 does not extend into the compartment formed by the front end 42, the cap sides 44, and cap top 46. The cap sides 44 include a slot 48 positioned half-way between the housing base 40 and the cap top 46. The conveyor drive mechanism of the portable drive-over grain hopper 10 includes two chain tensioning devices 50 located to the outside of the cap sides 44. The chain tensioning devices 50 are square plates with a central aperture 51 therethrough. A bearing 52 is attached to each chain tensioning device 50 such that an opening of the bearing 52 is in communication with the central aperture 51 of the chain tensioning device 50. A sprocket 54 is supported midway between the cap sides 44 by a shaft 56 having a key 58. The sprocket 54 is mounted by inserting the shaft 56 through the bearing 52 and through the central aperture 51 of the chain tensioning device 50, through the cap side 44, through the sprocket 54, through the other cap side 44, and finally through the bearing 52 and central aperture 51 of the opposite chain tensioning device 50. The sprocket 54 is secured to the center of the shaft 56 by the key 58 and the relative longitudinal position of the shaft 56 is fixed by securing the chain tensioning devices 50 to the cap sides 44.

Moving to the right longitudinally in FIGS. 1 and 2, the next section is that between the first pair of foldable, parallel ramps 12. In this section, the top of the upper housing chamber 22 is defined by the front bridge 30. The front bridge 30 spans the width of the hopper body housing 16, extends between the first pair of foldable, parallel ramps 12 and has the same longitudinal extent as the width of those ramps 12. The front bridge 30 is secured to the housing sides 38 along their upper longitudinal edges.

In the next section, the top of the upper housing chamber 22 is defined by the center grate 32 which serves as a grain inlet opening into the upper housing chamber 22 of the hopper body housing 16 (see also FIG. 3). The center grate 32 has a width equal to that of the housing base 40 and is secured to the housing sides 38 along their upper longitudinal edges. The center grate 32 extends longitudinally between the first pair of foldable, parallel ramps 12 and the second pair of foldable, parallel ramps 12. Preferably, the center grate 32 consists of a plurality of parallel plates or bars extending laterally from one housing side 38 to the other housing side 38. These plates or bars form a grating or filter which prevents any large particles or debris that may be present in the truck's load from entering the upper housing chamber 22.

In the next section, the top of upper housing chamber 22 is defined by the discharge bridge 34. The discharge bridge 34 spans the width of the hopper body housing 16, extends between the second pair of foldable, parallel ramps 12 and has the same longitudinal extent as the width of those ramps 12. Like the front bridge 30, the discharge bridge 34 is connected to the housing sides 38 along their upper longitudinal edges.

In the next section, the top of the upper housing chamber 22 is defined by the side grate 36. The side grate 36 has a width equal to that of the housing base 40 and is secured to the housing sides 38 along their upper longitudinal edges. The side grate 36 extends longitudinally from the discharge bridge 34 to a left or far end 37 of upper housing chamber 22. Like the center grate 32, the side grate 36 preferably is formed from a plurality of parallel plates or bars extending laterally from one housing side 38 to the other housing side 38. These plates or bars also form a grating or filter which prevents large particles or debris in the truck's load from entering into the upper housing chamber 22.

Figure 4:
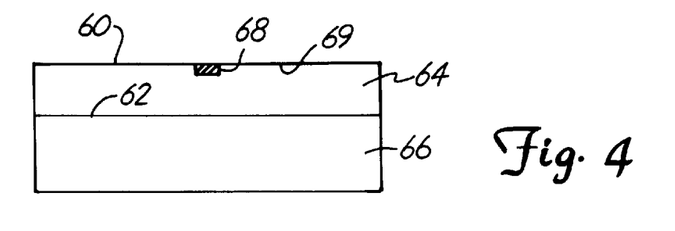
FIG. 4 is a schematic sectional view of the hopper body housing taken along line 4—4 in FIG. 1, with some parts not shown for clarity.

The next section of the hopper body housing 16 consists of an elbow housing 60. As shown in FIG. 4, the elbow housing 60 is rectangular in lateral cross-section. The elbow housing 60 has a laterally planar elbow grain transfer bed 62 extending longitudinally therethrough and dividing the elbow 60 into an upper elbow chamber 64 and a lower elbow chamber 66. As such, the upper elbow chamber 66 is in communication with the upper housing chamber 22, and the lower elbow chamber 66 is in communication with the lower housing chamber 24. In the longitudinal direction, the elbow 60 curves upwardly, from one end to its other end, for a total curvature of approximately forty-five degrees from the horizontal. In the upper elbow chamber 64, a polymer chain guide 68 (FIGS. 2 and 4) is secured to the center of a top surface 69 of elbow 60 (within the upper elbow chamber 64) and runs longitudinally from end-to-end.

Both the center grate 32 and the side grate 36 have guides for minimizing loss of grain to the outside of the portable drive-over grain hopper 10 during dumping. The center grate 32 has a rubber lip 70 which extends upwardly around its periphery. During operation, the rubber lip 70 can sometimes act as a seal between the center grate 32 and the opening of a belly-dump truck to prevent loss of grain during dumping. The side grate 36 is surrounded by a pair of side panels 72 and an end panel 74. The end panel 74 extends upwards substantially perpendicular to the hopper body housing 16 above the far end 37 of the upper housing chamber 22. The side panels 72 are attached adjacent upper longitudinal edges to the housing sides 38 and to the end panel 74 and extend upwards and outwards with respect to housing sides 38. During operation, the side panels 72 and the end panel 74 act to funnel grain exiting a side discharge outlet of a grain truck into the side grate 36. For transport or use only of the center grate 32, the side panels 72 and panel 74 fold down over the side grate 36 to serve as a cover therefor.

FIG. 2 also illustrates how the foldable, parallel ramps 12 are attached to the hopper body housing 16. At the point of connection, the hopper sides 38 have a plurality of ramp connection plates 76 extending laterally outward. Each of the ramp connection plates 76 has an aperture 78 at an upper end. Likewise, each of the foldable, parallel ramps 12 has an aperture 80 through an upper end of each vertical side panel thereof. The foldable, parallel ramps 12 are connected to the hopper body housing 16 by placing the foldable, parallel ramp 12 adjacent to the housing sides 38 such that the apertures 78 and the openings 80 are in alignment. A ramp rod 82 is then inserted through each of the openings 80 and 78 and secured in position to define a pivot pin for each ramp. The foldable, parallel ramps 12 are thus secured to the hopper body housing 16 in a pinned configuration. The ramps 12 are shown in a drive-over position in FIG. 1, and are shown in a folded upright position (ready for transport) in FIG. 5.

Figure 5:
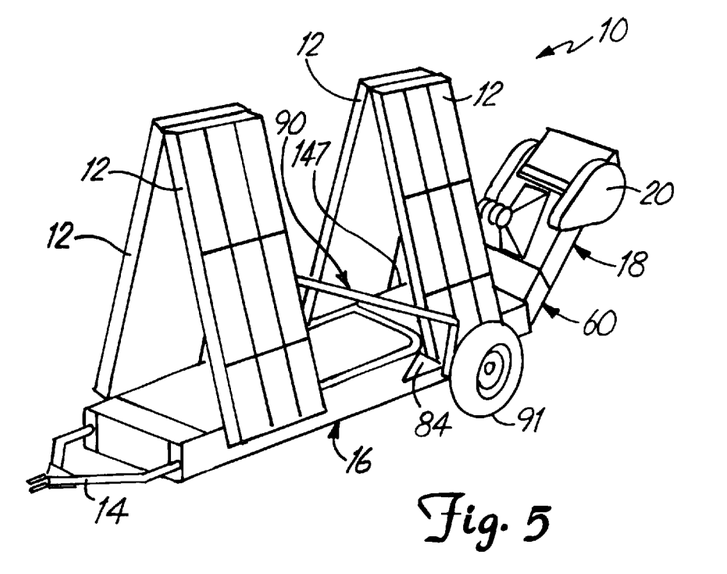
FIG. 5 is a perspective view of the portable drive-over hopper of FIG. 1 shown in its transportation configuration.

A removable ground transport axle assembly 90 is mountable on the hopper body housing 16, as illustrated in FIG. 5. The axle assembly 90 includes a pair of wheels 91 (only one of which is shown) which are aligned on a common axis. The hopper body housing 16 has a pair of pivot supports 84 extending laterally from each side thereof for supporting the ground transport axle assembly 90. The axle assembly 90 is formed from two opposed wheel supports 92 and 94, as seen in FIG. 2. The wheel supports 92 and 94 are mountable on the pivot supports 84 and are laterally telescopingly secured together (bar 96 of support 92 extends into and is secured to tube 98 of support 94).

Figure 6:
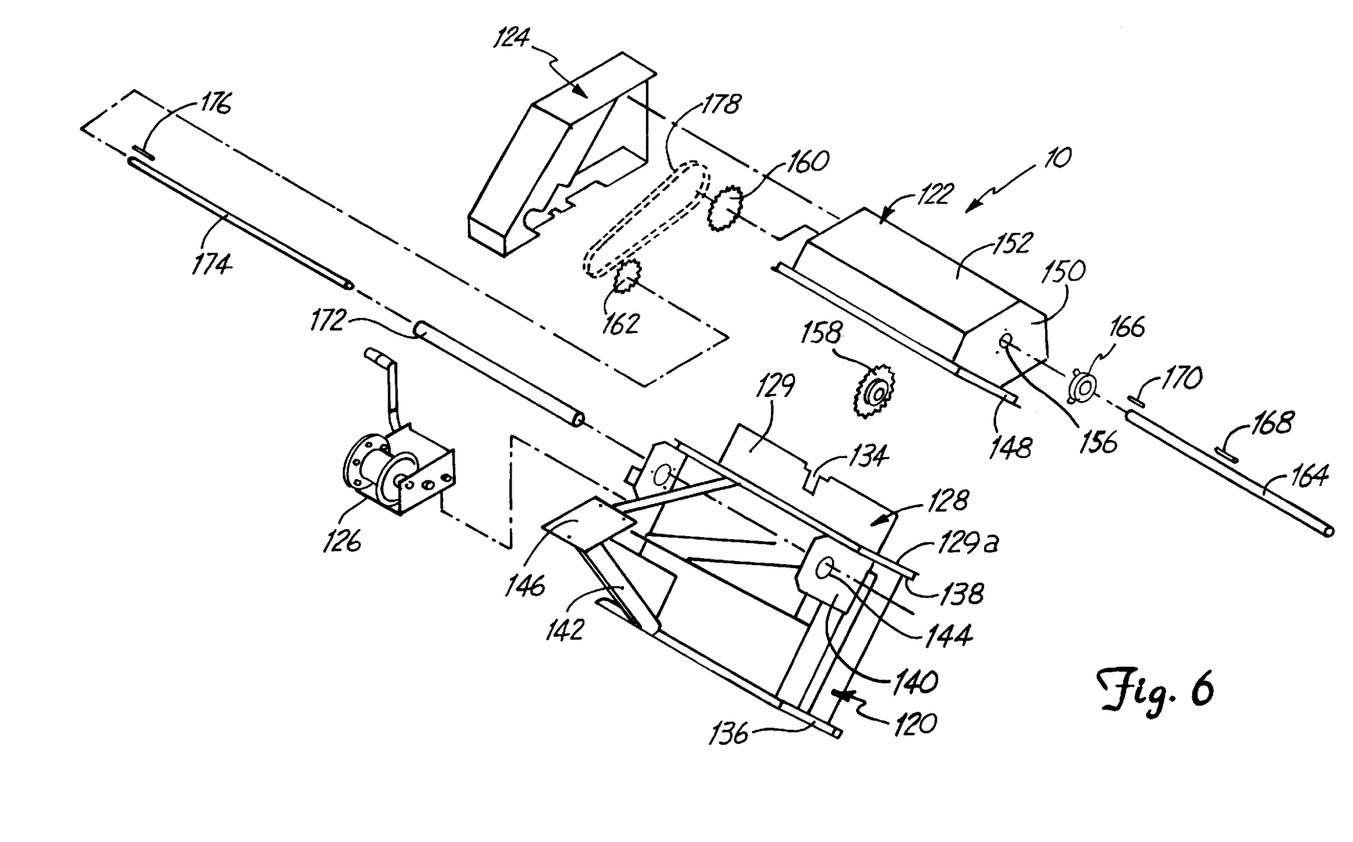
FIG. 6 is an exploded view of portions of the portable drive-over grain hopper of the present invention.
Figure 7:
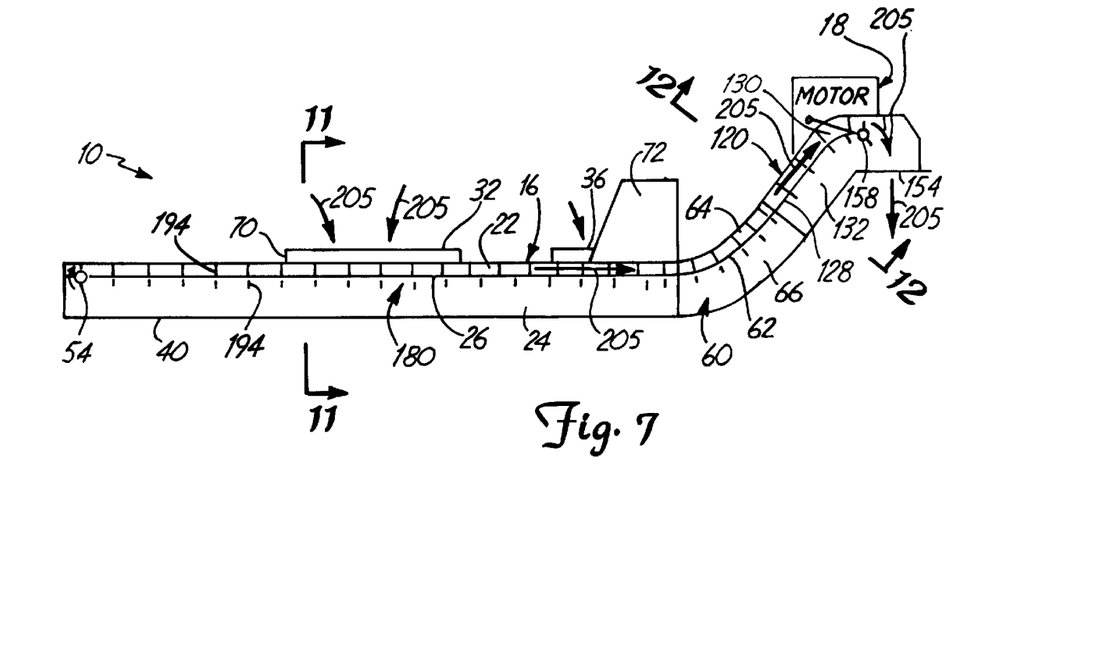
FIG. 7 is a longitudinal schematic sectional view of the portable drive-over grain hopper of FIG. 1.
Figure 8:
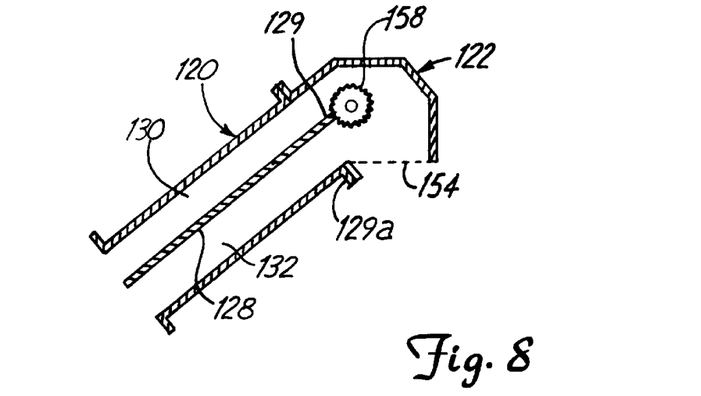
FIG. 8 is a schematic sectional view of the grain elevator housing as taken along a longitudinally extending central vertical plane.
Figure 9A:
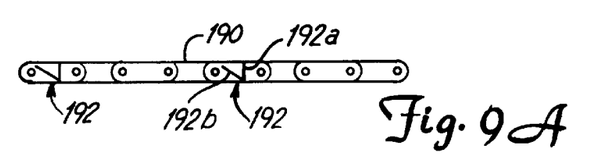
FIG. 9A is a side view of a portion of an endless conveyer linkage for use in the present invention.
Figures 9B, 9C:
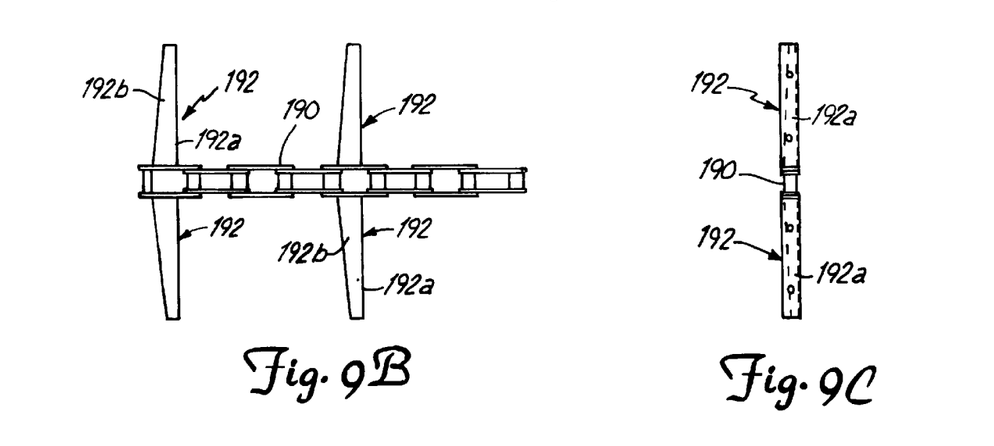
FIG. 9B is a top view of the endless conveyer linkage of FIG. 9A.
FIG. 9C is a front view of the endless conveyer linkage of FIG. 9A.

FIG. 6 shows an exploded view of some of the components of the grain elevator housing 18. The grain elevator housing 18 includes a lift housing 120, a discharge housing 122, a transmission housing 124, and a winch 126. As best shown in FIGS. 6, 7 and 8, the lift housing 120 has a grain transfer bed 128 which divides the lift housing 120 into an upper lift chamber 130 and a lower lift chamber 132. The grain transfer bed 128 extends in a plane laterally from one side of the lift housing 120 to the other side and has a longitudinal extension 129 which extends out an upper end 129a of the lift housing 120. The extension 129 has a conveyor clearance notch 134 cut into its center at its outer end, and is of the same lateral width as the grain transfer bed 128.

The grain transfer bed 128 is configured such that, when the lift housing 120 is connected to the elbow housing 60, the grain transfer bed 128 is aligned with the grain transfer bed 26 and the upper lift chamber 130 is in communication with the upper elbow chamber 64. Adjacent ends of the elbow grain transfer bed 62 and grain transfer bed 128 mate to provide a continuous grain transfer bed within the drive-over hopper 10 (see FIG. 7).

The lift housing 120 has lower flange 136, an upper flange 138, a pair of drive shaft supports 140, and a winch support 142. The lower flange 136 is configured to connect to the elbow housing 60 and the upper flange 128 is configured to connect to the discharge housing 122. The drive shaft supports 140 are rectangular in shape and each has an opening 144 through an upper end thereof The drive shaft supports 140 are mounted to the lift housing 120 and extend upward and substantially perpendicular thereto. The winch support 142 is mounted laterally near the center of the lift housing 120 and adjacent the lower flange 136. The winch support 142 extends upward from the lift housing 120 and supports a winch mounting plate 146, which in turn supports the winch 126 thereon. The winch 126 provides a mechanical advantage in raising the drive-over hopper 10 off the ground for relocation thereof A cable 147 (FIG. 5) is securable to the center of the ground transport axle assembly 90, and when the cable 147 is reeled in by the winch 126, the ground transport axle assembly 90 pivots about the pivot supports 84 to urge the tires 91 into contact with the ground, thereby elevating the portable drive-over hopper 10 to the position shown in FIG. 5.

The discharge housing 122 (FIG. 6) has a flange 148, two sides 150, a top 152, and a bottom grain discharge opening 154 (FIG. 8). The discharge housing 122 is configured such that when the portable drive-over grain hopper 10 is fully assembled, the plane of the grain discharge opening 154 is generally parallel to the ground (see FIG. 8). The sides 150 are six-sided and have an aperture 156 approximately through the center thereof The sides 150 are connected to the flange 148 and the top 152. The discharge housing 122 is connected to the lift housing 120 at their respective flanges 148 and 138.

The conveyor drive mechanism of the portable drive-over grain hopper 10 includes a chain sprocket 158, a drive sprocket 160, and a driving sprocket 162. The chain sprocket 158 and the drive sprocket 160 are key mounted on a drive shaft 164 for coupled rotation on that shaft. A bearing 166 is mounted on each of the sides 150 such that the bearings 166 are aligned with the apertures 156. Upon assembly, the drive shaft 164 is inserted through the bearings 166, the openings 156, the chain sprocket 158 and the drive sprocket 160. The chain sprocket 158 is aligned in the lateral center of the discharge housing 122 and held in place by a key 168 on the drive shaft 164. The drive sprocket 160 is mounted just outside of the discharge housing 122 and is likewise held in place by a key 170 on the drive shaft 164.

A tubular shaft guard 172 is inserted through the openings 144 in the shaft supports 140 on the lift housing 120. The shaft guard 172 is of a length such that each end protrudes slightly through each of the openings 144. A jack shaft 174 lies within the shaft guard 172 and is of a slightly greater length. The driving sprocket 162 is mounted to an end of the jack shaft 174 such that it protrudes from the same side of the grain elevator housing 18 as does the drive sprocket 160. The driving sprocket 162 is secured to the jack shaft 174 by a key 176. The driving sprocket 162 is operably connected to the drive sprocket 160 by an endless drive chain 178. The transmission housing 124 is mounted to the lift housing 120 and the discharge housing 122 such that it covers and protects the drive sprocket 160 and the driving sprocket 162. The jack shaft 174 is caused to rotate by a suitable drive motor means, which may be an electric or hydraulic drive motor as is known in the art. The drive motor means, its operable connections to chain sprocket 158 and related shields are referred to herein generally as the elevator drive system 20.

When the various housing components of the portable drive-over hopper 10 of the present invention are assembled, a grain transfer path (as illustrated in FIG. 7) is defined. The path is primarily defined by the upper chambers formed by the various housing sections, including upper hopper chamber 22, upper elbow chamber 64 and upper lift chamber 130 of the hopper body housing 16, elbow housing 60 and grain elevator housing 18, respectively. The grain transfer path within these upper chambers 22, 64 and 130 is itself primarily defined by the grain transfer beds 26, 62 and 128 (see FIG. 7). The grain transfer path, as defined by the beds 26, 62 and 128, has the same lateral width from the point where grain is received thereon (at the grain inlet defined by center grate 32, or at the side grate 36) as when the grain leaves the path adjacent the grain discharge opening 154. This feature, coupled with the grain conveyor described below, allows for a previously unattainable rapid and high volume transfer of grain through the portable drive-over hopper 10 of the present invention.

The grain is moved over the grain transfer beds 26, 62 and 128 by means of an endless conveyor 180 (FIG. 7) of the elevator drive system 20. The components of the conveyor 180 which come into contact with the grain are illustrated in FIGS. 9A, 9B, 9C, 10, 11, and schematically in FIG. 7. The conveyor 180 includes an endless conveyor chain linkage 190, paddle supports 192 and paddles 194. The endless conveyor chain linkage 190 is of a type commonly known in the art, having discrete longitudinal links connected by lateral pivot pins. The endless conveyer chain linkage 190 is configured to form an endless loop which extends from the sprocket 54 along the longitudinal center of the grain transfer bed 26 in the hopper body housing 16, across the grain transfer bed 62 in the elbow housing 60, and across the grain transfer bed 128 in the grain elevator housing 18, around the chain sprocket 158, and back underneath the aforementioned beds.

Figure 10:
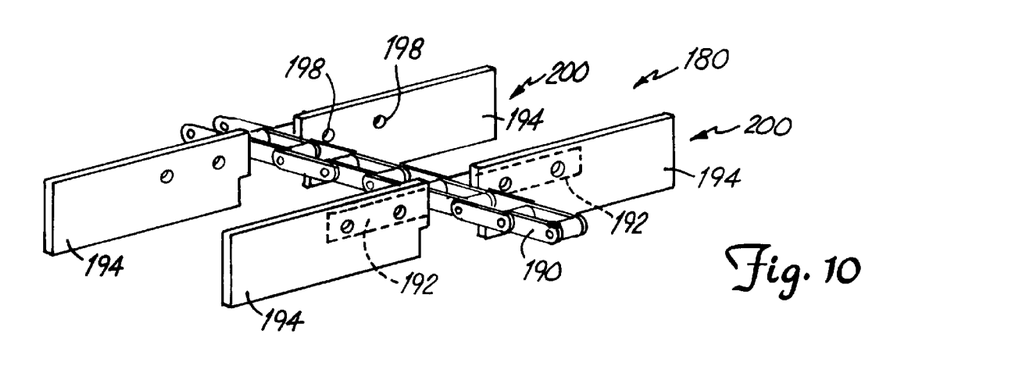
FIG. 10 is a perspective view of a portion of the endless grain conveyor used in the present invention.

The paddle supports 192 are spaced longitudinally along the endless conveyor chain linkage 190. At a desired longitudinal location, a paddle support 192 extends laterally from the chain linkage 190 on each side thereof. Each paddle support 192 has a paddle support section 192a and a trailing lateral brace section 192b. Inner ends of the sections 192a and 192b are welded to one of the links of the chain linkage 190 (see FIGS. 9A and 9B). The paddle 194 is connected to the paddle support section 192a by suitable means, such as threaded fasteners 198 inserted through holes in the paddle 194 and paddle support section 192a. As seen in FIG. 10, a paddle assembly 200 is defined at spaced locations along the chain linkage 190, with each paddle assembly 200 formed by two co-planar lateral paddles 194, one on each side of the chain linkage 190. The paddles 194 are generally rectangular in shape, and are preferably formed from ultra-high molecular weight recycled plastic material, thereby providing them with the necessary strength and rigidity to move grain at very high speeds through the portable drive-over hopper of the present invention, and to make them wear-resistant.

The conveyor 180 is mounted in the housings 16, 60 and 18, as illustrated in FIG. 7, to form an endless conveyor passing on the one hand through the upper chambers in those housings, and on the other hand through the lower chambers thereof When passing through the upper chambers 22, 64 and 130, the grain conveyor 180 and paddle assemblies 200 thereon move to the right, as viewed in FIG. 7. When moving through the lower chambers 24, 66, and 132, the grain conveyor 180 and paddle assemblies 200 thereon move to the left, as viewed in FIG. 7.

Figure 11:
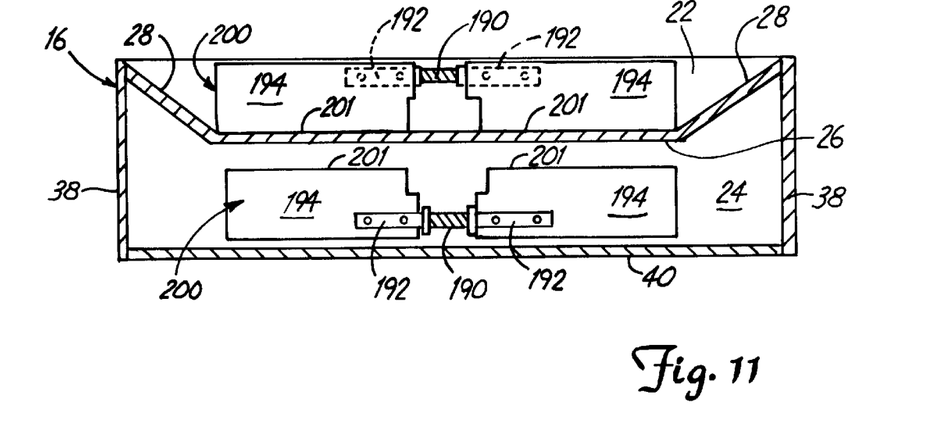
FIG. 11 is a schematic sectional view of the drive-over hopper of FIG. 7, as taken on lines 11—11.
Figure 12:
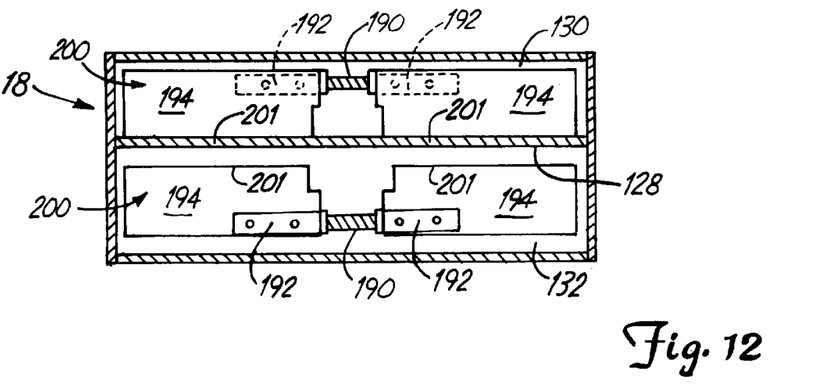
FIG. 12 is a schematic sectional view of the drive-over grain hopper of FIG. 7, as taken on lines 12—12.

Each paddle 194 is of a height such that it extends from the grain transfer beds 26, 62 and 128 nearly to the top wall of the respective chamber for each bed. Laterally, each paddle assembly 200 extends essentially entirely across the lateral width of the grain transfer beds 26 and 62 and lift bed 128, as illustrated in FIGS. 11 and 12. As seen in FIGS. 11 and 12, bottom edges 201 of the paddles 194 slide over the grain transfer beds 26, 62 and 128. The chamber interior clearances and dimensions in the elbow housing 60 (see FIG. 4) are generally the same as in the grain elevator housing 18 (FIG. 12), relative to the conveyor 180 and its paddle assemblies 200.

In operation, a truck or trailer is positioned on the portable drive-over grain hopper 10 such that its belly-dump opening is in alignment with the center grate 32. The elevator drive system 20 of the portable drive-over grain hopper 10 is activated such that the chain sprocket 158 begins to turn in a clockwise direction (as viewed in FIG. 7). As grain from the truck or trailer enters the center grate 32, it passes through the center grate 32, enters the upper housing chamber 22 and lands upon the grain transfer bed 26. At this point, the grain is contacted by the paddles 194 of the longitudinally spaced paddle assemblies 200 connected to the endless chain linkage 190. The paddles 194 slide longitudinally across the grain transfer bed 26 to push the grain from left to right, as seen in FIG. 7. This continues as the paddles travel across the grain transfer bed 26 in the hopper body housing 16, over the grain transfer bed 62 in the elbow housing 60, and finally over the grain transfer bed 128 in the grain elevator housing 18. When the conveyor 180 turns the corner at the chain sprocket 158, the grain falls off the free end of the bed extension 129 and exits the portable drive-over grain hopper 10 through the discharge opening 154. This grain travel path is illustrated in FIG. 7 by arrows 205. Continued movement of the conveyor 180 causes the paddle assemblies 200 to travel back to the beginning (sprocket 54) by traveling underneath the grain transfer beds 134, 62 and 26 until reaching sprocket 54 where they are realigned for another left-to-right pass along the grain transfer path.

Alternatively, the grain may be emptied into the side grate 36. Such grain is moved through the portable drive-over grain hopper 10 to the discharge 154 in the identical manner as previously discussed, with a shorter grain transfer path.

FIG. 5 shows the portable drive-over grain hopper 10 in its transportation configuration. To prepare the portable drive-over grain hopper 10 for relocation, the foldable parallel ramps 12 are rotated around the ramp rods 82 until they can be secured in an upward position as shown in FIG. 5. The opposed wheel supports 92 and 94 of the movable ground transport axle assembly 90 are then assembled and aligned on their respective pivot supports 84. Once, the wheel supports 92 and 94 are secured together, the portable drive-over grain hopper 10 is then raised off the ground by means of cable 147 and winch 126. As the cable 147 is wound about winch 126, it pivots the axle assembly 90 about the pivot supports 84, bringing the tires 91 into contact with the ground and raising the upper body housing 16 up off the ground. Once in this configuration, the portable drive-over grain hopper 10 may be easily moved by connecting the hitch 14 to another vehicle for transport thereof.

The portable drive-over hopper 10 of the present invention provides a fast, convenient and very low profile means for unloading belly-dump or side-dump trucks, trailers or wagons. The inventive grain hopper is easy to set up for use, and likewise is easy to fold up and prepare for transport. The use of the inventive grain transfer chambers, relatively wide grain transfer beds, and paddle assembly endless conveyor of the present invention results in a portable drive-over grain hopper which has a much larger grain transfer capacity than the prior art, with a lower overall height. These key features (a low profile and high grain transfer capacity) are important in terms of product versatility and meeting the rigorous and speed demands required for grain transfer during the short harvest season. The use of the conveyor arrangement of the present invention presents a portable drive-over grain conveyor having an operable grain transfer chamber that is larger than was previously attainable in the art.

The applicant has attained grain transfer rates up to 7,000 bushels per hour using the portable grain transfer hopper of the present invention, which has only an overall height at its drive-over area (adjacent the ramps 12) of 9.75 inches. In the preferred embodiment obtaining such a transfer rate, the lateral width of the grain transfer bed is 24.25 inches, the depth of the upper grain transfer chambers is 3.25 inches and the depth of the lower conveyor return chambers is 4.5 inches. The overall lateral width of the upper body housing is approximately 36 inches (exterior dimension), while the lateral width dimension of the inlet opening at the grates 32 and 36 is approximately 32 inches. The lateral width dimension of the elbow housing 60 and grain elevator housing 18 is approximately 24.5 inches (exterior dimension), and the height of the grain discharge outlet from the ground (when in the operating position illustrated in FIG. 1) is approximately 26 inches. The overall longitudinal length of the portable grain transfer hopper 10 of the present invention is 198 inches (without the hitch 14), and the longitudinal length from the center of the grate 32 to the end of the discharge opening 154 is approximately 132 inches. Each paddle 194 is three inches high and ten inches across laterally. Collectively, the paddle assembly 200 has a lateral width dimension of 23.5 inches.

Although the present invention has been described with reference to preferred embodiments, workers skilled in the art will recognize that changes may be made in form and detail without departing from the spirit and scope of the invention.

What is claimed is:

1. A low profile portable drive-over grain hopper comprising:

a hopper body housing defining a hopper chamber therein, and the hopper chamber being aligned under a top wall of the hopper body and between longitudinally disposed sides and laterally disposed ends thereof;

a grain elevator housing connected to the hopper body housing, the grain elevator housing defining a grain elevator chamber having a lower end and a higher upper end, the lower end being coupled to one end of the hopper body and the upper end having a grain discharge outlet;

a pair of foldable, parallel ramps extending from each side of the hopper body housing, the ramps spaced apart for reception of a truck or wagon thereon;

at least one grain inlet opening in the top wall of the hopper body housing, with the grain inlet opening being aligned between the ramps;

a pair of ground transport wheels removably mountable to the hopper body housing;

hitch means for selectively coupling the hopper body housing to a prime mover for relocation thereof;

a laterally planar grain transfer bed extending across the hopper and grain elevator chambers to divide them into respective upper and lower chambers, the upper chamber being a grain transfer chamber and the lower chamber being a conveyor return chamber, the upper and lower chambers extending through both the hopper body and grain elevator housings, the grain transfer bed having an operative width, and the grain transfer chamber being in communication with both the grain inlet opening in the top wall of the hopper body housing and the grain discharge outlet at the upper end of the grain elevator housing;

a single endless conveyor linkage extending longitudinally over and under the grain transfer bed;

a plurality of spaced-apart grain paddle assemblies center cantilever connected to the single endless conveyor linkage, each paddle assembly extending laterally substantially across the operative width of the grain transfer bed and having a lower paddle edge which slides over the grain transfer bed to move grain therealong; and drive means for moving the endless conveyor linkage and paddle assemblies connected thereto through the grain transfer and conveyor return chambers.

2. The portable drive-over grain hopper of claim 1 wherein the vertical height of the hopper body housing is less than ten inches.

3. The portable drive-over grain hopper of claim 1, and further comprising:

a wall extending upwardly from the top wall of the hopper body housing and about at least a portion of the grain inlet opening to aid in directing grain into the grain inlet opening.

4. The portable drive-over grain hopper of claim 3 wherein the wall extends about the entire grain inlet opening.

5. The portable drive-over grain hopper of claim 3 wherein the wall is flexible.

6. The portable drive-over grain hopper of claim 1 wherein the laterally planar grain transfer bed and the grain discharge outlet have generally the same lateral width.

7. The portable drive-over grain hopper of claim 1 wherein the lateral width dimension of the generally planar grain transfer bed is the same from the grain inlet opening to the grain discharge outlet.

8. The portable drive-over grain hopper of claim 1, and further comprising:

longitudinally extending diverter ramps for directing grain from the grain opening onto the operative width of the laterally planar grain transfer bed.

9. A low portable drive-over grain hopper comprising:

a hopper body housing defining a hopper chamber therein, and the hopper chamber being aligned under a top wall of the hopper body and between longitudinally disposed sides and laterally disposed ends thereof;

a grain elevator housing connected to the hopper body housing, the grain elevator housing defining a grain elevator chamber having a lower end and a higher upper end, the lower end being coupled to one end of the hopper and the upper end having a grain discharge outlet;

a pair of foldable, parallel ramps extending from each side of the hopper body housing, the ramps spaced apart for reception of a truck or wagon thereon;

at least one grain inlet opening in the top wall of the hopper body housing, with the grain inlet opening being aligned between the ramps;

a pair of ground transport wheels removably mountable to the hopper body housing; hitch means for selectively coupling the hopper body housing to a prime mover for relocation thereof;

a single endless conveyor linkage extending longitudinally through the hopper body housing and the grain elevator housing;

a grain conveyor support extending through the hopper and grain elevator chambers to support the single endless conveyor linkage and define two passageways for movement of the siingle endless conveyor linkage therethrough, a first passageway being a grain transfer passageway and a second passageway being a conveyor return passageway, the first and second passageways extending through both the hopper body and grain elevator housings, the first passageway having an operative width, and being in communication with both the grain inlet opening in the top wall of the hopper body housing and the grain discharge outlet at the upper end of the grain elevator housing.

a plurality of spaced-apart grain paddle assemblies center cantilever connected to the to the single endless conveyor linkage, each paddle assembly extending laterally relative to the operative width of the first passageway and having a paddle edge which slides through the first passageway to move grain therealong, from the hopper body toward the grain discharge outlet of the grain elevator housing; and drive means for moving the single endless conveyor linkage and paddle assemblies connected thereto through the grain transfer and conveyor return passageways.

10. The portable drive-over grain hopper of claim 9 wherein the vertical height of the hopper body housing is less than ten inches.

11. The portable drive-over grain hopper of claim 9, and further comprising:

a wall extending upwardly from the top wall of the hopper body housing and about at least a portion of the grain inlet opening to aid in directing grain into the grain inlet opening.

12. The portable drive-over grain hopper of claim 11 wherein the wall extends about the entire grain inlet opening.

13. The portable drive-over grain hopper of claim 11 wherein the wall is flexible.

14. The portable drive-over grain hopper of claim 9 wherein the grain transfer passageway and the grain discharge outlet have generally the same lateral width.

15. The portable drive-over grain hopper of claim 9 wherein the lateral width dimension of the grain transfer passageway is the same from the grain inlet opening to the grain discharge outlet.

16. The portable drive-over grain hopper of claim 9, and further comprising: longitudinally extending diverter ramps for directing grain from the grain inlet opening onto the operative width of the grain transfer passageway.

17. The portable drive-over grain hopper of claim 9 wherein the single endless conveyor linkage is a chain.

18. The portable drive-over grain hopper of claim 9, and further comprising:

a second grain inlet opening in the top wall of the hopper body housing, with the second grain inleet opening being between one of the ramps and the grain elevator housing.

19. The portable drive-over grain hopper of claim 18, and further comprising:

a wall extending upwardly from the top wall of the hopper body housing and about at least a portion of the second grain inlet opening to aid in directing grain into the second grain inlet opening.

20. The portable drive-over grain hopper of claim 19 wherein the wall extends about at least a portion of three sides of the second grain inlet opening.

21. The portable drive-over grain hopper of claim 18, and further comprising:

longitudinally extending diverter ramps for directing grain from the second grain inlet opening onto the operative width of the grain transfer passageway.

22. A low profile portable drive-over grain hopper comprising:

a hopper body housing defining a hopper chamber therein, and the hopper chamber being aligned under a top wall of the hopper body and between longitudinally disposed sides and laterally disposed ends thereof;

a grain elevator housing connected to the hopper body housing, the grain elevator housing defining a grain elevator chamber having a lower end and a higher upper end, the lower end being coupled to one end of the hopper body and the upper end having a grain discharge outlet;

a pair of foldable, parallel ramps extending from each side of the hopper body housing, the ramps spaced apart for reception of a truck or wagon thereon;

at least one grain inlet opening in the top wall of the hopper body housing, with the grain inlet opening being aligned between the ramps;

a pair of ground transport wheels removably mountable to the hopper body housing;

hitch means for selectively coupling the hopper body housing to a prime mover for relocation thereof;

a single endless conveyor linkage extending longitudinally through the hopper body housing and the grain elevator housing along a conveyor loop defined by an upper conveyor path and a lower conveyor path, wherein one of the conveyor paths is in communication with both the grain inlet opening in the top wall of the hopper body housing and the grain discharge outlet at the upper end of the grain elevator housing;

a plurality of longitudinally spaced-apart grain paddle assemblies center cantilever connected to the single endless conveyor linkage, each paddle assembly extending laterally relative to the conveyor path which is in communication with both the grain inlet opening in the top wall of the hopper body housing and the grain discharge outlet at the upper end of the grain elevator housing to move grain from the hopper body housing toward the grain discharge outlet of the grain elevator housing; and drive means for moving the single endless conveyor linkage and paddle assemblies connected thereto along the upper and lower conveyor paths.

23. The portable drive-over grain hopper of claim 22, and further comprising:

a pair of opposed, angled and longitudinally extending side panels aligned to divert grain from the grain inlet opening onto the conveyor path traversed by the grain paddle assemblies as the grain paddle assemblies move from the grain inlet opening toward the grain discharge outlet.

24. The portable drive-over grain hopper of claim 22 wherein the single endless conveyor linkage is a chain.

25. The portable drive-over grain hopper of claiim 22 wherein the vertical height of the hopper body housing is less than ten inches.

26. The portable drive-over grain hopper of claim 22, and further comprising:

a wall extending upwardly from the top wall of the hopper body housing and about at least a portion of the grain inlet opening to aid in directing grain into the grain inlet opening.

27. The portable drive-over grain hopper of claim 26 wherein the wall extends about the entire grain inlet opening.

28. The portable drive-over grain hopper of claim 27 wherein the wall is flexible.

29. The portable drive-over grain hopper of claim 22, and further comprising:

a second grain inlet opening in the top wall of the hopper body housing, with the second grain inlet opening being between one of the ramps and the grain elevator housing.

30. The portable drive-over grain hopper of claim 29, and further comprising:

a wall extending upwardly from the top wall of the hopper body housing and about at least a portion of the second grain inlet opening to aid in directing grain into the second grain inlet opening.

31. The portable drive-over grain hopper of claim 30 wherein the wall extends about at least a portion of three sides of the second grain inlet opening.

32. The portable drive-over grain hopper of claim 29, and further comprising:

longitudinally extending diverter ramps for directing grain from the second grain inlet opening onto the operative width of the grain transfer passageway.

* * * * *

UNITED STATES PATENT AND TRADEMARK OFFICE
CERTIFICATE OF CORRECTION

PATENT NO. : 5,964,566
DATED : OCTOBER 12, 1999
INVENTOR(S) : RONALD S. STEWART ET AL.

It is certified that error appears in the above-identified patent and that said Letters Patent is hereby corrected as shown below:

Col. 6, line 27, after "thereof" insert --.--

Col. 6, line 50, after "thereof" insert --.--

Col. 10, line 65, after "grain" insert --inlet--

Col. 10, line 67, after "low" insert --profile--

Col. 11, line 9, after "hopper" insert --body--

Col. 11, line 27, delete "siingle" insert --single--

Col. 11, line 36, after "housing" insert --;--

Col. 12, line 12, delete "inleet" insert --inlet--

Col. 12, line, 64, delete "path" insert --paths and having a paddle edge which slides through the conveyor path--

Col. 13, line 17, delete "claiim" insert --claim--

Signed and Sealed this

Ninth Day of May, 2000

Attest:

Q. TODD DICKINSON

Attesting Officer

Director of Patents and Trademarks